United States Patent [19]

West

[11] Patent Number: 4,648,158
[45] Date of Patent: Mar. 10, 1987

[54] CLIP FOR ATTACHING WIRES

[76] Inventor: Robert West, R.F.D. 1, Box 682, Pownal, Me. 04069

[21] Appl. No.: 726,725

[22] Filed: Apr. 24, 1985

[51] Int. Cl.⁴ .............................................. B65D 63/06
[52] U.S. Cl. ................................ 24/23 W; 24/20 CW; 24/23 R; 206/343
[58] Field of Search .............. 24/20 CW, 20 W, 23 R, 24/23 W, 67.9, 563; 206/343, 346

[56] References Cited

U.S. PATENT DOCUMENTS

| | | | |
|---|---|---|---|
| 1,407,709 | 2/1922 | Tibbals | 24/23 W |
| 2,329,440 | 9/1943 | La Place | 206/343 |
| 2,691,198 | 10/1954 | Flood | 24/23 W |
| 2,976,592 | 3/1961 | Christin | 24/23 W |
| 3,013,654 | 12/1961 | Hoff | 206/343 |
| 3,032,184 | 5/1962 | Kuster | 24/23 W |
| 3,170,160 | 2/1965 | Burniston | 206/343 |
| 3,296,673 | 1/1967 | Kirkpatrick | 24/67.9 |
| 3,604,065 | 9/1971 | Slominski | 24/23 R |
| 3,612,475 | 10/1971 | Dinger | 24/23 W |
| 4,508,220 | 4/1985 | Pearson | 24/20 W |

Primary Examiner—Victor N. Sakran
Attorney, Agent, or Firm—William Nitkin

[57] ABSTRACT

An improved U-clip of the type having a first side with a pair of transversely-spaced prongs with bevelled inside ends and a second side having a medial prong with a bevelled inside end is disclosed, such clip further having rounded side edges.

2 Claims, 3 Drawing Figures

CLIP FOR ATTACHING WIRES

BACKGROUND OF THE INVENTION

1. Field of the Invention

The device of this invention is an improved U-clip and more particularly relates to the type of U-clips applied to hold pairs of wires together.

2. Description of the Prior Art

U-clips been long been known and used with applying tools to hold parallel wires together in fields such as upholstery where they hold the various wire springs and wires together. These clips have more recently been utilized in other fields such as lobstering in the construction of wire lobster traps where the clips are utilized to assemble the traps by holding the wire sections together.

U-clips commonly are assembled in strips held together by a carrier tape and are fed into applying machines. The applying machines cause the clips to be reformed tightly around the parallel wires. A problem, though, has been noted when using the prior art clips in the construction of lobster traps. Prior art U-clips come with squared-off ends on their prong members. The lobster trap wire is plastic or vinyl-coated in order to prevent electrolysis. When clips of the prior art are utilized in the construction of lobster traps, the inside of the squared-off ends of the clips dig into and cause cuts and abrasions in the plastic coating on the wire, often penetrating the coating and exposing the steel wire inside. When the lobster trap is in use in the ocean, salt water comes in contact with the wire through such cuts and by the process of electrolysis, current is created and the wire in the lobster trap corrodes and disintegrates in a much shorter span of time than its normal lifetime if the vinyl covering were not damaged by the clip member.

SUMMARY OF THE INVENTION

It is an object of this invention to provide a new and improved clip member to be assembled in a strip array with a carrier strip holding the clips in longitudinal side-to-side relation which can be fed into a clip-applying tool which often can be a hand-operated electric device which forces the prongs of the clips together around the wires to be joined.

It is a further object of this invention to overcome the problem of U-clip induced cuts and abrasions on coated lobster trap wires. The clip of this invention utilizes a pair of transversely spaced prongs with a central space therebetween extending up to a top portion which extends then to a medially disposed prong which when the clip is folded around the wires to be joined, allows the transversly spaced prongs to fold up beside the medial prong and the medial prong to fold into the space between the transversely spaced prongs so that the clip forms a closed structure around the joined wires. In the improved clip of this invention, the ends of the prongs are bevelled from the inside out so that when they are applied around the wires, they slide by the plastic coating on the lobster trap wires without cutting thereinto. The exterior sides are rounded so that when they are folded around the coated wires, they also do not dig into the vinyl or plastic covering on the wires. The clip of this invention utilizes a flat top, and the carrier strip, instead of extending around the undulating surface of the crowns of the clips of the prior art, extends across the flat top surface of the clip from the top of one clip's flat surface to the next which design allows for a shorter piece of carrier strip to be used and for a simpler construction method of clip assemblies.

As the vinyl coating will not be cut by the improved clip of this invention, less care is required in the operation of the applying tool resulting in increased productivity. Further, the bevelled ends allow thicker material to be used in the construction of the clip because the taper of the prongs allows the material to pass easily around the vinyl coating without cutting it and the thinner tapered portions thereof allow for improved bending and clinching of the heavier materials around the wires.

DESCRIPTION OF THE PREFERRED EMBODIMENT(S)

Figure 1:
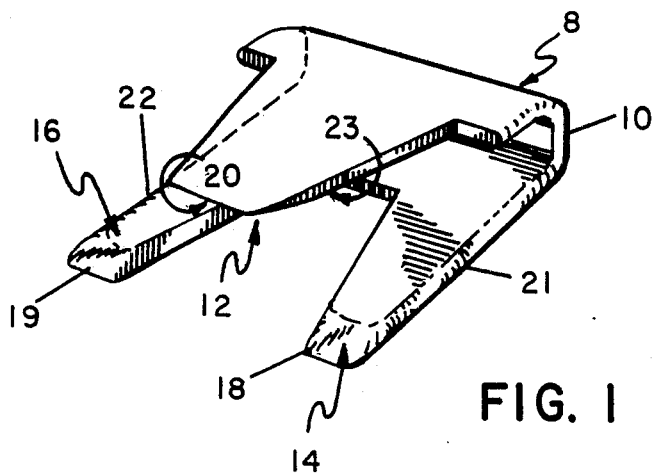
FIG. 1 illustrates a perspective view of the improved U-clip of this invention.

FIG. 1 illustrates the improved clip of this invention which can be constructed of aluminum or equivalent material showing the flattened top 10 thereof onto which the carrier strip is adhered running from flattened top to flattened top of adjacent clips. From its top, the clip extends downward on its first side to medial prong 12 which does not extend sideways as far as the side edges of the top of the clip. On the opposite second side of the clip there extends a portion downward terminating in two transversely-spaced prongs 14 and 16 at the side edges of the clip. The prongs of this improved clip have bevelled sections 18 and 19 respectively on the inside ends of the transversely-spaced prongs 14 and 16 which bevelling extends at an angle outward tapering to a point to avoid having the squared-off inside ends of the prior art clips. Similar bevelling 20 is on the inside of the medial prong 12 extending so that it tapers to a point on the outer surface of said clip's second side. In a further embodiment the outer side edges 21 and 22 of the clip can be rounded which will prevent any digging into the vinyl coating once the clip is closed around the parallel wires of the lobster trap.

Figure 2:
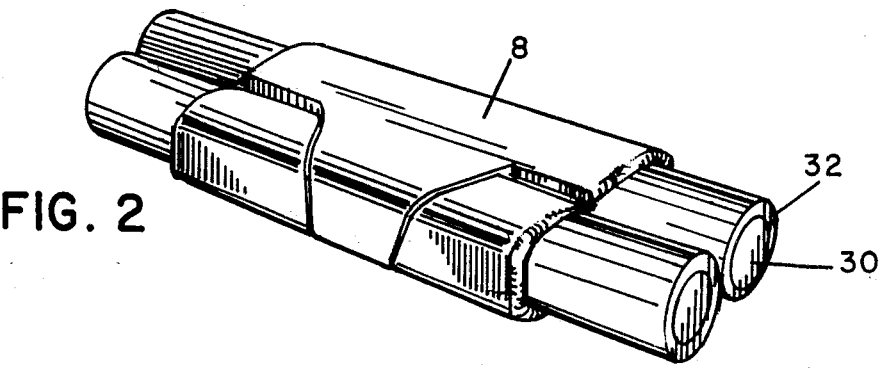
FIG. 2 illustrates a pair of vinyl-coated lobster trap wires held together by the improved clip of this invention.

FIG. 2 shows clip 8 of this invention wrapped around the parallel vinyl-coated wires of a lobster trap. Seen in this view is steel core 30 of the wire 30 surrounded by a vinyl or other equivalent plastic coating 32. Clip 8 is seen closed therearound in normal fashion.

Figure 3:
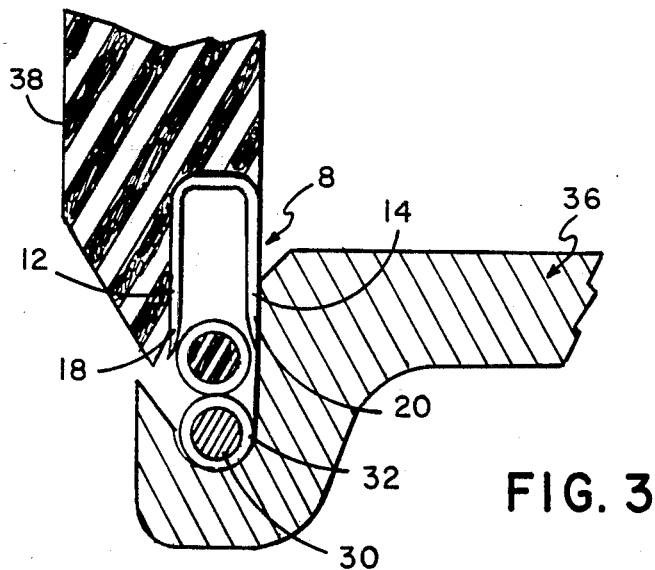
FIG. 3 illustrates the U-clip of this invention within an applying tool to be applied around two vinyl-coated lobster trap wires without damage thereto.

FIG. 3 illustrates the clip of this invention within an applying tool which is starting to apply the clip to a pair of vinyl-coated lobster trap wires. Although bevelled edges 18 and 20 are visible, bevelled edge 19 of prong 16 cannot be seen because it is directly behind bevelled edge 18. It can be observed that as this clip is passed around vinyl coating 32, it will not dig thereinto, and the bevelled edges will allow the clip to pass easily therearound without damage to such coating.

Although the present invention has been described with reference to particular embodiments, it will be apparent to those skilled in the art that variations and modifications can be substituted therefor without departing from the principles and spirit of the invention.

I claim:

1. An improved U-clip for joining coated wires of the type having a top with a first side of said U-clip extending and forming a pair of transversely-spaced prongs having a space defined therebetween and the second side of said U-clip extending substantially parallel to said first side and terminating in a medial prong of a size such that when said U-clip is folded in use, said medial prong fits within the space formed between said transversely-spaced prongs of said first side, said medial prong having space defined on both its sides adapted to receive said transversely-spaced prongs when folded thereupinto, wherein the improvement comprises:

bevelled inside ends of said transversely-spaced prongs and said medial prong, said ends bevelled to taper to a point from the inside of said clip toward the outside of said clip, said bevelled ends adapted to slide by said coating on said wires when installed and being adapted not to dig into or pierce said coating.

2. The clip of claim 1 wherein the side edges of said clip are rounded.

* * * * *